Sept. 30, 1947.  B. L. LUBELSKY ET AL  2,428,334
PROTECTIVE DEVICE FOR BLASTING CIRCUIT
Original Filed July 7, 1941
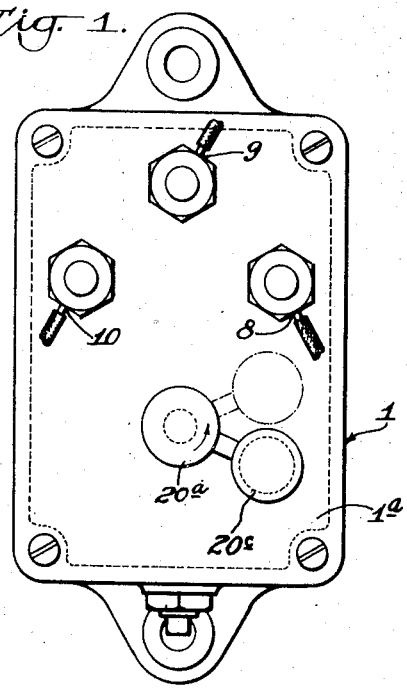
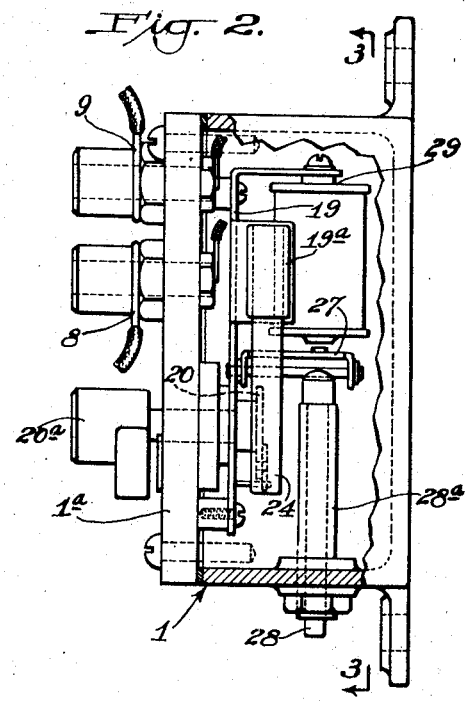
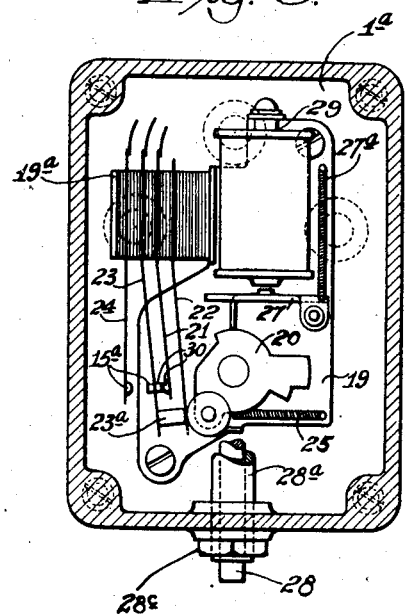
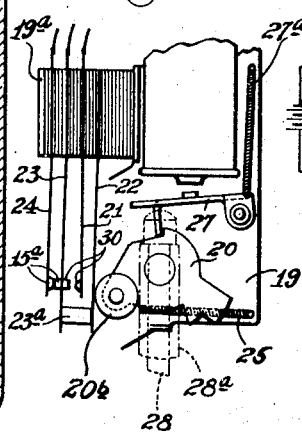
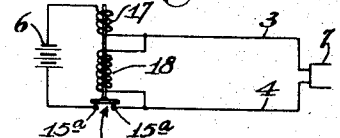
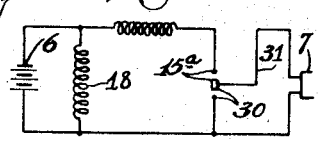
INVENTORS
BENJAMIN L. LUBELSKY
RALPH E. HARTLINE
BY Frank L. Foote
ATTORNEY.

Patented Sept. 30, 1947

2,428,334

UNITED STATES PATENT OFFICE 2,428,334

PROTECTIVE DEVICE FOR BLASTING CIRCUIT

Benjamin L. Lubelsky, Elkton, Md., and Ralph E. Hartline, Tulsa, Okla., assignors to Mine Safety Appliances Company, Pittsburgh, Pa., a corporation of Pennsylvania Substituted for abandoned application Serial No. 401,346, July 7, 1941. This application July 12, 1944, Serial No. 544,582

12 Claims. (Cl. 175—115)

1

This invention relates to a protective device in the nature of a circuit breaking device for an electrical circuit such as may be adaptable for energizing a blasting charge and which usually includes electrical conductors connecting the charge or squib to a source of electrical energy and controlled by a manual operable switch. This application is a substitution for our application Serial No. 401,346, filed July 7, 1941, now abandoned.

In the event of the squib or charge is not set off upon closure of the switch, it frequently occurs that the operator will seek out the defect in the installation without first opening the switch. Such a condition has created a serious hazard and has been the cause of serious accidents in mines and other locations where large charges are used for breaking or dislocating material. Several attempts have been made to devise some form of a device which will insure the opening of the circuit before an attempt is made to correct the defect, but these devices have been directed to particular installations and in other cases have been merely extemporaneous creations made to direct the operator's attention to opening the circuit before pursuing the cause of failure.

It is an object of this invention to provide a protective device operable by an electrical shot firing impulse which is especially adaptable to any blasting circuit and which can be incorporated therein without any modification thereof and which is inexpensive in construction, rugged, simple in operation and contains few parts subject to wear and these are such as not to be affected in operation by wear so as to impair the efficiency of operation of the device nor affect in any way the security provided by the installation of the device.

In the mining industry, a source of energy is supplied to a shot firing circuit which may originate from some form of a hand-operated generator, or, as is usually the case, from an energy storage means such as a battery or condenser. The disadvantage in applying such a source to a blasting circuit is that the circuit is energized beyond the time required to set off the charge. In most cases, a circuit need be energized by a suitable source only from 1- to 8-thousandths of a second in order to heat the filament of the charge sufficiently to produce an explosion. The

2 control means used heretofore for interrupting the circuit has been of a manual control type which can not be operated in such a short interval of time or is not so operated because of the human element involved and results in the creating of another serious hazard in this industry. This is due to the fact that in an ordinary blast the electrical conductors connected to the charge are actually blown from their set position along with the material and a continued energization of the circuit after the occurrence of the explosion sometimes may result in a sparking due to the engagement of the conductors after the blast. Since a methane atmosphere originates from a dislodging of coal, this condition would cause an accidental explosion and provides an ever present danger in this particular industry. However, it is equally important that any suitable apparatus, which is supplied to interrupt the circuit after passage of a shot firing electrical impulse, be operative to interrupt the circuit in the event the charge is not set off.

It is an object of this invention to provide a protective device which can be incorporated in a blasting circuit and includes a circuit interrupter energized by a shot firing impulse to open the circuit and is arranged and operative to energize the circuit interrupter irrespective of the condition of the circuit beyond the installation of the protective device and without placing a material power load on the shot firing circuit.

Still another hazard exists in mining operations and in similar industrial occupations where high explosives are used due to ground currents which migrate towards the conductors of an open blasting circuit. The difference of potential between the conductors of an open circuit sometimes is sufficient to cause a premature detonation when a charge is connected to the conductors of a blasting circuit.

It is an object of this invention to incorporate as a part of a protective device a means which will automatically form a short circuit of the main blasting circuit upon interruption of the main circuit in order to prevent the formation of a difference in potential between that portion of the blasting circuit conductors directly connectable to the blasting charge.

Further objects of this invention will become apparent from a description of the preferred embodiment of our invention which illustrates the principle involved and represents a practical type of device successfully employed in the protection of blasting circuits.

In the drawings:

Fig. 1 illustrates a front elevational view of a switch box containing the protective device;

Fig. 2 is a side elevational view with a portion of the switch box broken away in order to illustrate the arrangement of elements that constitute the preferred embodiment and with the wiring omitted for the purpose of clarity;

Fig. 3 is a sectional view taken along the line 3—3 of Fig. 2 and illustrates the device less wiring for purpose of clarity in one phase of its operation corresponding to a normal open position of the power source contacts controlled by the device.

Fig. 4 is a view similar to Fig. 3 and illustrates the device in another phase of its operation corresponding to a position representing a closure of the power source contacts;

Fig. 5 is a wiring diagram illustrating a simplified electrical arrangement of the device and providing protection for the operator against an inoperative circuit; and Fig. 6 is a wiring diagram of the preferred embodiment and illustrates in addition to Fig. 5 the arrangement of a switch means which is operative upon opening of the switch controlling the main circuit to close a circuit that includes the blasting charge to eliminate the hazard due to accumulation of ground currents.

This invention has been developed purposely for application in protection of blasting circuits used in mining operations, and it is recognized that this merely represents one application of the invention and it can be applied broadly to protection of any electrical circuit where it is desirable to affect the circuit after its closure in order to insure the establishment of an open circuit condition after a predetermined time interval has lapsed.

In the embodiment illustrated in the drawings, a switch box 1 made of some suitable moisture-proof material such as metal or any of the moisture-proof electrical insulating plastic materials or any other suitable material and in which the electrical protective circuit interrupting device is contained and supported and to be inserted in a circuit which normally includes a pair of conductors 3 and 4, Figs. 5 and 6, connecting a source of energy represented as a battery 6 to a blasting charge 7. The device is actually mounted onto a removable cover 1a of the box. A pair of terminals 8 and 9 are mounted onto the outside of the cover of the switch box for connecting the in portion of the conductors. An additional terminal 10 is supplied to connect the out portion of the conductors to the device to be actuated, the terminal 9 serving as one common to both of the connections. In other words, one conductor is connected through the device by means of a common connection to the terminal 9, whereas the other conductor is connected through the device by means of a connection through terminals 8 and 10.

A feature of this invention is that by connecting this protective device into the circuit, the device is operative to automatically open the circuit after a time interval has occurred following the closure of the circuit for setting off the charge. This is accomplished in the embodiment by a relay switch 15, Figs. 5 and 6, which is composed in part of a current or low impedance coil 17 placed in series in the circuit with the charge and arranged to be sufficiently energized by the passage or shot firing impulse of current adequate for setting off the charge to open the contacts 15a of the relay switch to open the circuit and provide protection against an inadvertent closure of the circuit.

It is preferred to use an electrical responsive means in the relay which is energized by the application of a shot firing impulse to the circuit and which does not have a high load capacity and does not affect materially the energy supplied for igniting the charge. This requirement, therefore, requires a low impedance, highly inductive coil generally referred to as a current coil. This type of coil can be made to operate in a time delay manner to maintain the circuit closed for a period sufficient to permit the filament of the charge to be energized. Because of the need for a compact and inexpensive interrupter, it is advantageous to employ instead some form of a mechanical delay device which becomes operative after the coil is energized rather than employ electrical delay means. A mechanical type of delay is illustrated in the embodiment and will be hereinafter described.

In the event that the charge is not set off, the current coil connected in series with the device to be actuated may fail to be energized sufficiently to open the contacts and the circuit will continue closed. Representing an important part of this invention is the incorporation in the circuit of a second circuit and preferably including a coil 18 introduced in a precise relation to the charge and in operative relation to the switch to open the circuit. To permit the normal and required energization of the blasting circuit and which is energized by the application of a source of power to the circuit, a type of coil of relatively higher impedance than the current coil is used and is usually referred to as a voltage type of coil containing a much larger number of turns of wire of smaller size than the current coil. This voltage coil is connected into the circuit in shunt or parallel relation with the blasting charge and is a part of an auxiliary circuit including the source of energy and preferably includes the series or current coil but excludes the major portion of the blasting circuit including the charge.

In the construction illustrated, the coils 17 and 18 are placed in such relation to the armature of the relay switch that they both contribute to the opening of the switch. The actual arrangement illustrated in the embodiment of a switch actuator influenced by the energization of the coils is made up of a rotatable arm 20 mounted to a back plate 19 that is in turn attached to the cover of the box that may be moved from the front of the switch box by means of a knob 20a directly connected to the arm. This arm when moved engages a flat resilient strip 22 that is mounted onto an insulating bracket 19a connected to the back plate 19. A flat resilient strip 21 is also mounted on insulating bracket 19a. Contacts 15a are carried on similar resilient strips 23 and 24 of the switch 15. This switch arm is constructed so as to be uneven in its outer periphery as of a cam contour and by movement will cause the strip 22 through an insulating abutment 23a on the strip 23 to move the contact of the contactor strip 23 into engagement with the contact of the other contactor strip 24 to close the circuit to the blasting charge.

Fig. 3 represents the normally open position of the switch and by moving the switch arm to the position illustrated in Fig. 4, the contacts 15a are closed and a latch member and armature 27 engages a shoulder formed in the outer periphery of the rotating arm and holds it in a position where the contacts 15a are closed. A spring 27a is attached to the pivoted end of the latch to have a bearing engagement of the latch against the peripheral surface of the arm and insure a latching of the arm when the arm is moved to a position comparable to a closed position of the contacts 15a. Moving the arm into this position places a tension on a return spring 25 connected to the back strip. Positioned in operative relation to this latch member are the coils of the relay switch 15 which are mounted on a core 29 and are so arranged that upon their energization the inductance produced is sufficient to draw the latch member from engagement with the switch arm and allow the arm to move due to the action of the return spring to its normal open position as represented by the opening of the contacts 15a. The arm is illustrated as carrying a circular member 20b that is of insulating material and insulates the arm from the contact strips and is advantageous in giving more linear travel to the limited movement of the arm. Closing of the circuit immediately causes an impulse of current to pass through the circuit which is enough to energize the filament of the charge and is adequate to energize the current coil 17.

Energization of the current coil 17 causes the latch member 27 to be drawn from engagement with the rotatable arm 20 and due to the attachment of the return spring 25 to the arm force is applied to return it to its normal position corresponding to an open position of the contacts 15a. Since the coil is not of the time delay type, it is energized rapidly and the latch would be released and the contacts opened before enough time would have elapsed for the charge to be set off. It is recognized that some form of an electrical time delay means can be incorporated in the coil 17 such as a copper slug positioned on the lower part of the armature or similar means for causing a counter E. M. F. which would oppose the energization of the armature by the principal inductance coil, but as previously mentioned, it is preferred for the sake of simplicity, compactness and expense that some form of a mechanical delay device be incorporated for accomplishing the time delay interval. In the embodiment, an inertia member 20c is directly connected to the knob 20a or rotatable arm and in a position comparable to the closed position of the contacts 15a, it is in the position represented by dotted lines in Fig. 1. Because of its inertia effect, the force applied by the spring 25 is not sufficient to produce an instant movement of the inertia member from the closed position to an open position illustrated in full lines in Fig. 1. It is recognized that movement of the member from an upper position to a lower position is affected by gravity and accentuates the force applied to the arm in moving from a closed position to an open position. However, the force of inertia opposing the return force of the spring is sufficient to retain the member in its closed position sufficiently long to allow the circuit to be energized for an interval adequate for setting off the charge. This arrangement provides one form of adjustment in that by increasing the arm length of the inertia member, a longer time would elapse assuming that the same weight is used in both instances. It is to be recognized that this invention is concerned with an interval of time that is very small and the effect of inertia is sufficient to provide this time delay in opening of the contacts 15a. Some time delay is provided in the amount of movement required of the arm 20 before the contacts 15a become separated.

Should the charge fail to detonate for some reason, an auxiliary circuit is connected to the conductors 3 and 4 and includes preferably the voltage and high impedance coil 18 arranged in parallel relation to the charge and is operative upon the application of energy to the terminals 8 and 9 to release the switch arm to open the contacts 15a. Because of its nature, it may be that a longer time delay occurs in its energization sufficient to withdraw the latch from the rotatable arm, but the additional time is not sufficient to cause any hazard of consequence. This coil may be placed between the series coil and the charge as illustrated in Fig. 5 or it may be placed between the source of energy 6 and the current coil as illustrated in Fig. 6. An advantage of this type of coil is its low energy requirements and its installation across the line does not decrease to any material extent the energy applied to the charge.

It might be suggested that a single coil be employed and a shunt circuit be included which will energize the operating coil in the event of an open circuit between the operating coil and charge. Employing resistances in the shunt circuit places an additional load on the circuit and may interfere with providing the necessary amount of current to energize the filament in the charge. It is apparent that if a current type or low impedance coil is used some form of resistance must be included in the shunt circuit in order that the coil will be sufficiently energized in the event of an open circuit beyond the coil. A voltage type of coil in series has too high an impedance and when subjected to the current requirements of the charge would entail a material power loss. In the event that a resistance should be included in the shunt circuit to provide the current requirement for the current coil, the power consumption of a sufficient resistance would depreciate considerably the supply from the charge and may be to such an extent that the charge would not be set off or would require the use of a source of energy of greater power capacity. However, the device would be operative and can be used if the power losses are not of importance. Another arrangement would be to place the operative coil in the shunt circuit or circuit parallel to the device to be actuated and incorporate a resistance unit in series with the charge between the connection of the coil and charge. This arrangement entails a material power loss and has similar disadvantages and is not recommended, although the device is operative.

In normal operation of the preferred embodiment, when a device is actuated the current and voltage coils are energized and together they release the latch 27 and the contacts 15a are opened. In the event of an open circuit, the voltage coil is energized to open the contacts 15a while a short circuit of the circuit causes the current coil to be energized to open the contacts 15a. Thus, all circuit conditions are accommodated and in all instances, the armature or latch member is attracted to release the arm to open the contacts in the circuit connecting the device to a source of current.

While these modifications represent operative devices and it is intended they be included in this invention, the preferred embodiment represents a distinct improvement over the modification and structure in accordance with the embodiment. In operation, the embodiment operates on ordinary blasting circuits and without requiring any energy increase since the power used during normal blasting use of the voltage and switch operating coil is of such small proportion as not to affect the current supplied to the charge and is operative to open the contacts in the event the current coil is not energized. The current coil is sufficiently energized by the passage of a shot firing impulse to open the contacts.

In order to check the operation of the device, it is advisable to provide some form of a manual operable means of release of the latch to test the operation and inspect the wiring after the relay is set and without connecting the battery or shot firing generator and also to release the relay to return it to the "safe" condition without energizing the relay. This consists in the embodiment of a plunger or pin 28 which has an enlarged head that rests on top of a sleeve 28a attached to the box and extends to the outside and positioned to engage the latch and release the switch arm.

As previously explained, it is desirable, especially in mining, to provide some form of a shunt circuit adjacent the charge connected to the conductors 3 and 4 and to include a pair of contacts 30. In the embodiment, one of the contacts is carried by the flat strip 23 and the other by another flat strip 21. These are arranged so that the contacts 30 of the shunt ground current circuit are closed when the switch arm is in an open position of the contacts 15a. Release of the arm by the latch in effect closes this circuit and includes the charge, if present, while opening the contacts of the main circuit. This shunt circuit 31 is to eliminate the effects of ground currents that may accumulate on idle conductors between the place of connection of the protective device and the ends to be connected to a charge by connecting the device end of each conductor together and eliminates any difference in potential between the conductors 3 and 4. Ordinarily, the length of conductors from the protective device to the connection for the charge is large. The advantage gained by the inclusion of this circuit, Fig. 6, does not complicate the original protective device such as illustrated in Fig. 5 and does not require much expenditure over the simplified circuit and can be incorporated in the embodiment by merely the insertion of another contact strip placed in an operative position relative to the normally open position of the strip 23.

A further means of time delay adjustment is included in the embodiment by threading a nut to the bottom end of the sleeve 28a which extends through the box in order to raise and lower the upper extent of the sleeve and enlarged end of the pin 28. This action limits the lower position of the latch 27 when the contacts 15a are in a closed position and the space existing between the relay 29 and the latch 28. If the strength of inductance is less than ordinary, the pin can be moved up again to the latch when positioned as in Fig. 4 and reduce the amount of engagement with the switch arm and require less energization of the coil to move the latch to disengage the switch arm.

According to the provisions of the patent statutes, we have explained the principle and mode of operation of our invention and have illustrated and described what we now consider to represent its best embodiment. However, we desire to have it understood that, within the scope of the appended claims, the invention may be practiced otherwise than as specifically illustrated and described.

We claim:

1. A protective arrangement comprising a device to be actuated by the flow of electric current and a main circuit to connect the device to a source of energy, circuit interrupting means in the main circuit comprising a normally open switch means in the circuit, a manual means to close the switch, an electrically energizable switch operating means in the circuit to open the switch in a time delay manner after closure of the switch means and a higher impedance energizable switch operating means arranged operatively with respect to the switch means and connected into the circuit in parallel relation to the device.

2. A protective arrangement comprising a device to be actuated by the flow of electric current, a circuit connected therewith, and circuit interrupting means comprising a switch means in the circuit, a low impedance switch operating inductance coil in the circuit in series relation with the device, a high impedance switch operating inductance coil connected into the circuit in parallel relation to the device whereby the switch means is normally operated through the circuit formed by the low impedance coil and is operated by the energization of the high impedance coil in the event of failure of the low impedance coil to operate the switch means, and a time delay means to delay operation of the switch means after energization of the circuit.

3. A protective arrangement comprising a device to be actuated by the flow of electric current, a main circuit connected therewith, and circuit interrupting means in the circuit comprising a switch means, a current switch operating coil connected into the circuit in series relation relative to the device, a voltage switch operating coil connected into the circuit in parallel relation to the device, a mechanical time delay switch actuator responsive to the energization of the coils to operate the switch means, and a shunt circuit connected to the main circuit between the current coil and the device and containing contacts controlled by the switch means and arranged to be closed by opening of the switch means in the main circuit to close the shunt circuit.

4. A protective switch for an electrical circuit including a device to be actuated comprising a switch means having contact points in series with the circuit to complete the circuit to the device, an electrical operable means to actuate the switch means comprising a low impedance inductance coil in series with the circuit and a high impedance inductance coil in parallel relation with the circuit and a switch actuating time delay means responsive to the electrical operable means comprising a switch arm pivotally mounted to rotate to control the contact means, a return means attached to the arm to yieldably hold the switch means in a normally open position, a latch mounted in operative relation relative to the electrical operable means and arranged to releasably engage the switch arm and retain the switch means in a closed position, a manual means to move the arm to a closed position of the contacts whereby the latch engages the arm and holds it in the set position, the latch being disposed to be moved by the energization of the electrical operable means to release the switch arm which is restored to its normal position by the action of the return means to open the contacts and interrupt the circuit, and a retardation means to delay return of the switch arm to its normal position.

5. A protective device for a blasting circuit including a blasting charge and an electrical circuit thereto and terminal means for connecting the blasting charge to a source of energy comprising a support for the terminal means, a switch means having its contact points in series with the circuit and including an actuator comprising a rotatable means arranged to close the contact points by movement in one position and to open the contact points by movement in the opposite direction, a normal restoring means attached to the rotatable means, an electrically energizable relay means, a latch means positioned between the relay means and the actuator and arranged to be influenced by the energization of the relay means and operative to retain the actuator in a predetermined set position while being operative further to release the actuator and allow it to return to its normal position when the relay means is energized, a time delay member attached to the rotatable means to retard movement of the rotatable means to normal position, and the relay means comprising a low impedance inductance coil in series with the circuit and a high impedance inductance coil in parallel relation with respect to the blasting circuit to operate the latch means in the event the low impedance coil fails to release the actuator from the latch means.

6. A protective device for a blasting circuit including a blasting charge and an electrical circuit thereto and terminal means for connecting the blasting charge to a source of energy and comprising a support for the terminal means, a switch means having its contact points in series with the circuit and including a time delay actuator comprising a rotatable means arranged to close the contact points by movement in one position and to open the contact points by movement in the opposite direction, an electrically energizable relay means, a latch means positioned between the relay means and the actuator and arranged to be influenced by the energization of the relay means and operative to retain the actuator in a predetermined set position while being operative further to release the actuator and allow it to return to its normal position when the relay means is energized, a normal time delay restoring means attached to the rotatable means, the relay means comprising a low impedance inductance coil in series in the circuit and a high impedance inductance coil in parallel relation with respect to the blasting circuit to operate the latch means in the event the low impedance coil fails to release the actuator from the latch means, a shunt circuit positioned between the relay means and the charge and including switch contacts, and a switch means operatively related to the first mentioned switch means and being arranged to close the contacts of the shunt circuit by movement of the actuator to a position corresponding to an interruption of the circuit of the blasting charge.

7. A protective device for a blasting circuit including a blasting charge and an electrical circuit thereto and terminal means for connecting the blasting charge to a source of energy comprising a support for the terminal means, a switch means having its contact points in series with the circuit and including an actuator comprising a rotatable means arranged to close the contact points by movement in one position and to open the contact points by movement in the opposite direction, an electrically energizable relay means, a latch means positioned between the relay means and the actuator and arranged to be influenced by the energization of the relay means and operative to retain the actuator in a predetermined set position while being operative further to release the actuator and allow it to return to its normal position when the relay means is energized, a mechanical time delay means incorporated in the actuator in delaying the opening of the contacts after release of the rotatable means by the latch means, and the relay means comprising a low resistance inductance coil in series with the circuit and a high resistance inductance coil in parallel relation with respect to the blasting circuit to operate the latch means in the event the low resistance coil fails to release the actuator from the latch means, and a means of adjustment for altering the relative position of the latch means with respect to the relay means while the latch means is in engagement with the rotatable means and disposed in a position to close the contact points in the circuit.

8. A protective device for blasting comprising, a source of electrical energy, an electrically operated blasting cap in circuit therewith, and a safety switch in the circuit, the safety switch comprising a circuit breaker, and a shunt impedance in parallel with the blasting cap, located in the circuit between the circuit breaker and the blasting cap.

9. Protective apparatus for use with an electrically-operable device, comprising a main circuit adapted to connect said device with a source of electric current, a switch in said circuit, means responsive to the current in said circuit and placed in series in said circuit for opening the switch immediately after operation of said device, and means shunted across said circuit and responsive to the voltage therein for opening the switch in case said device fails to operate.

10. Protective apparatus for use with an electrically-operable device, comprising a main circuit adapted to connect said device with a source of electric current, a switch in said circuit biased toward open position, movable means for holding the switch closed, means responsive to the current in said circuit for removing said switch-holding means from operative position immediately after operation of said device, and means shunted across said circuit and responsive to the voltage therein for removing said switch-holding means from operative position in case said device fails to operate.

11. Protective apparatus for use with an electrically-operable device, comprising a main circuit adapted to connect said device with a source of electric current, a switch in said circuit biased toward open position, movable means for holding the switch closed, and electromagnetic means shunted across the circuit between said switch and device and energized by the voltage in the circuit if the circuit is broken beyond the electromagnetic means, the latter being adapted when energized to remove said switch-holding means from operative position, whereupon the switch opens.

12. A protective arrangement comprising a device to be actuated by the flow of electric current, a circuit connected therewith, and circuit interrupting means comprising a switch means in the circuit, a low impedance switch operating inductance coil in the circuit in series relation with the device, and a high impedance switch operating inductance coil connected into the circuit in parallel relation to the device whereby the switch means is normally operated through the circuit formed by the low impedance coil and is operated by the energization of the high impedance coil in the event of failure of the low impedance coil to operate the switch means.

BENJAMIN L. LUBELSKY.
RALPH E. HARTLINE.

REFERENCES CITED

The following references are of record in the file of this patent:

UNITED STATES PATENTS

| Number | Name | Date |
|---|---|---|
| 422,524 | Happoldt | Mar. 4, 1890 |
| 2,303,315 | Bailes | Dec. 1, 1942 |
| 1,112,639 | Miller | Oct. 6, 1914 |
| 2,341,349 | Williams | Feb. 8, 1944 |
| 1,225,388 | Woodbridge | May 8, 1917 |
| 1,837,188 | Keller | Dec. 22, 1931 |

FOREIGN PATENTS

| Number | Country | Date |
|---|---|---|
| 757,734 | France | Dec. 30, 1933 |